(12) United States Patent
Unetich

(10) Patent No.: US 9,934,534 B2
(45) Date of Patent: Apr. 3, 2018

(54) THROTTLING MODIFICATION MESSAGES

(75) Inventor: Michael Unetich, Chicago, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

(21) Appl. No.: 13/077,951

(22) Filed: Mar. 31, 2011

(65) Prior Publication Data

US 2012/0254007 A1    Oct. 4, 2012

(51) Int. Cl.
*G06Q 40/04* (2012.01)

(52) U.S. Cl.
CPC .................... *G06Q 40/04* (2013.01)

(58) Field of Classification Search
CPC .................................................. H04L 43/0852
See application file for complete search history.

(56) References Cited

U.S. PATENT DOCUMENTS

| | | | | |
|---|---|---|---|---|
| 5,297,031 | A * | 3/1994 | Gutterman et al. | 705/37 |
| 6,779,018 | B1 * | 8/2004 | Yamashita et al. | 709/203 |
| 7,124,110 | B1 * | 10/2006 | Kemp et al. | 705/37 |
| 7,483,850 | B1 | 1/2009 | Fishbain et al. | |
| 7,512,557 | B1 * | 3/2009 | Fishbain et al. | 705/36 R |
| 7,716,118 | B2 * | 5/2010 | Bartko et al. | 705/37 |
| 8,086,527 | B2 * | 12/2011 | Bauerschmidt et al. | 705/38 |
| 8,296,217 | B1 * | 10/2012 | Howorka | 705/37 |
| 2003/0145103 | A1 * | 7/2003 | Pruyne et al. | 709/237 |
| 2007/0118453 | A1 | 5/2007 | Bauerschmidt et al. | |
| 2007/0118455 | A1 | 5/2007 | Albert et al. | |
| 2008/0306857 | A1 * | 12/2008 | Busby | 705/37 |
| 2010/0076884 | A1 * | 3/2010 | Lutnick et al. | 705/37 |
| 2011/0054780 | A1 * | 3/2011 | Dhanani et al. | 701/204 |
| 2011/0078068 | A1 * | 3/2011 | Fishbain et al. | 705/37 |
| 2011/0166984 | A1 * | 7/2011 | Owens et al. | 705/37 |
| 2012/0005062 | A1 * | 1/2012 | Lutnick et al. | 705/37 |
| 2014/0019511 | A1 * | 1/2014 | Fradkov et al. | 709/201 |

FOREIGN PATENT DOCUMENTS

| | | |
|---|---|---|
| JP | 2009-516292 A | 4/2009 |
| JP | 2014-510978 A | 5/2014 |
| WO | 2012/135336 A1 | 4/2012 |

OTHER PUBLICATIONS

Manual Financial Data Correction Using Idle/Interval-Based Blending Engine, Jul. 27, 2010.*

(Continued)

*Primary Examiner* — Scott S Trotter
(74) *Attorney, Agent, or Firm* — McDonnell Boehnen Hulbert & Berghoff LLP

(57) ABSTRACT

The present embodiments relate to intelligently throttling a modification message based on a period of time that a trade order is required to remain in a market. In an embodiment, intelligently throttling a modification message includes intelligently selecting a transmission time of a modification message based on a period of time that a trade order is required to remain in a market. The modification message is transmitted at the selected time to ensure that the modification order is received at an electronic exchange at or shortly after, but not before, the period of time has expired. As a result, the modification order is accepted (e.g., not rejected) by the electronic exchange. The modification order does not need to be resent to the electronic exchange.

10 Claims, 7 Drawing Sheets

(56) References Cited

OTHER PUBLICATIONS

International Preliminary Report on Patentability and Written Opinion for International Patent Application No. PCT/US2012/030935, dated Oct. 1, 2013 (dated Oct. 10, 2013).
International Search Report for International Patent Application No. PCT/US2012/030935, dated May 3, 2012 (dated May 23, 2012).
AsiaEtrading.com, "Trading Technologies Connects to Osaka Securities Exchange", Feb. 15, 2011, retrieved from the Internet on May 26, 2011.
AsiaEtrading.com, "Trading Technologies Expanding Connectivity to Japanese Derivatives Exchanges", Jan. 21, 2011.
Automated Trader, "TT Delivers Access to Japanese Derivatives", Q1 2011, p. 11.
Banking Business Review, "Trading Technologies connects to Japan's Osaka Securities Exchange", Feb. 15, 2011, retrieved from the Internet on May 26, 2011.
Barron's, Tulane Trading Contest, Nov. 2, 2009.
Commodities Now, "TT Expanding Connectivity to Japanese Derivatives Exchanges", Jan. 20, 2011, retrieved from the Internet on Jan. 24, 2011.
Datacenter Dynamics, "Trading Technologies further links derivatives customers", Mar. 28, 2011, retrieved from the Internet on May 26, 2011.
Datamonitor Research Store, "Trading Technologies releases new connection to Osaka Securities Exchange", Feb. 18, 2011, retrieved from the Internet on May 26, 2011.
Financial Tech Spotlight, "Trading Technologies Linking Japanese Trading Networks through Expanded Connectivity", Jan. 19, 2011.
High Frequency Traders, "TT Joins Osaka Securities Exchange", Feb. 15, 2011, retrieved from the Internet on May 26, 2011.
InfoNet, "The Democratisation of HFT", Mar. 2011.
Markets Media, "Japanese Exchanges Build Out Connectivity", Jan. 20, 2011.
Trading Technologies International, Inc., "Autospreader: A Powerful Spreading Tool for X_TRADER® Pro", 2011.
Trading Technologies International, Inc., "Autotrader: A Powerful Autotrading Tool for X_TRADER® Pro", 2009.
Trading Technologies International, Inc., "Electronic Trading and Risk Management Solutions for Energy Trading Professionals", 2011.
Trading Technologies International, Inc., "MD Trader: The Most Sought-After Technology in Trading", 2009.
Trading Technologies International, Inc., "X_TRADER 7: the Next Generation in Futures Trading", 2009.
Trading Technologies International, Inc., Autospreader Feature Guide, Version 7.9.1, Document Version 7.9.X.DV1, Mar. 9, 2011.
Trading Technologies International, Inc., Autotrader Feature Guide, Version 7.9.1, Document Version 7.9.X.DV1, Mar. 10, 2011.
Trading Technologies International, Inc., Buyside Brochure, 2011.
Trading Technologies International, Inc., Synthetic Order Entry in X_TRADER Setup Guide, Document Version 7.9.1, Mar. 10, 2011.
Trading Technologies International, Inc., X_TRADER User Manual, Version 7.9.1, Document Version 7.9.X.DV1, Mar. 10, 2011, pp. 1-125.
Trading Technologies International, Inc., X_TRADER User Manual, Version 7.9.1, Document Version 7.9.X.DV1, Mar. 10, 2011, pp. 126-245.
Trading Technologies International, Inc., X_TRADER User Manual, Version 7.9.1, Document Version 7.9.X.DV1, Mar. 10, 2011, pp. 246-342.
Trading Technologies International, Inc., X_TRADER User Manual, Version 7.9.1, Document Version 7.9.X.DV1, Mar. 10, 2011, pp. 343-440.
Trading Technologies International, Inc., X_TRADER User Manual, Version 7.9.1, Document Version 7.9.X.DV1, Mar. 10, 2011, pp. 441-530.
Trading Technologies International, Inc., X_TRADER User Manual, Version 7.9.1, Document Version 7.9.X.DV1, Mar. 10, 2011, pp. 531-592.
Trading Technologies International, Inc., X_TRADER Version 7.9 Setup Guide, Document Version 7.9.x, Feb. 11, 2011.
Trading Technologies International, Inc., X_TRADER Version 7.9.x Setup Guide, Document Version 7.9.x, Mar. 10, 2011.

* cited by examiner

Exchange A

| | |
|---|---|
| Period of Time | 350 milliseconds |
| Requirement Value | 355 milliseconds |
| Buffer | 5 milliseconds |

Exchange B

| 8:00 – 10:00am | |
|---|---|
| Period of Time | 650 milliseconds |
| Requirement Value | 650 milliseconds |

| 10:00am – 1:00pm | |
|---|---|
| Period of Time | 750 milliseconds |
| Requirement Value | 752 milliseconds |

FIGURE 4

THROTTLING MODIFICATION MESSAGES

BACKGROUND

The described technology is directed to an electronic trading system.

An electronic trading system generally includes one or more trading devices in communication with an electronic exchange (or multiple electronic exchanges). An electronic exchange receives messages that include trade orders from a trading device, such as a client device, gateway, or a server collocated with the electronic exchange. A trade order is an order to buy or sell a tradeable object at a particular price. Upon receiving a message with a trade order, the electronic exchange may enter the trade order into an exchange order book and attempt to match quantity of the trade order with quantity of one or more contra-side orders. A sell order is contra-side to a buy order with the same price. Similarly, a buy order is contra-side to a sell order with the same price.

Unmatched quantity of a trade order is held in the exchange order book until quantity of a trade order is matched by the electronic exchange. Upon matching quantity of the trade order, the electronic exchange may send a confirmation to the trading device that quantity of the trade order was matched. Unmatched quantity of a trade order may be modified (e.g., changed or cancelled) either by the trading device or the electronic exchange.

BRIEF DESCRIPTION OF THE DRAWINGS

Example embodiments are described herein with reference to the following drawings.

FIG. 4 is a diagram of an exemplary configuration screen.

Figure 1:
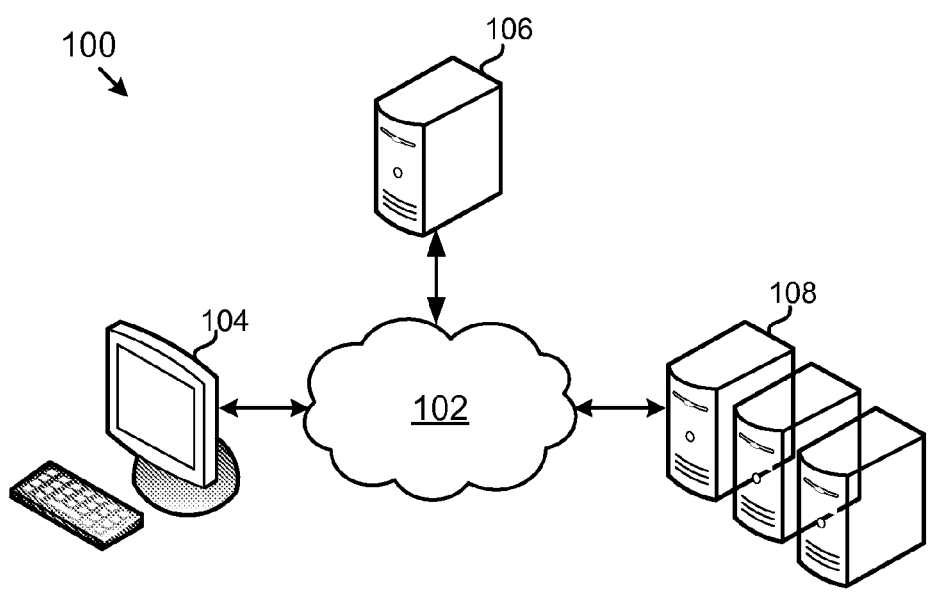
FIG. 1 is a block diagram of an exemplary electronic trading system including a trading device, a gateway, and an electronic exchange.

The following description will be better understood when read in conjunction with the drawings illustrating certain exemplary embodiments. It is understood that the inventions are not limited to the arrangements and instrumentality shown in the drawings.

DETAILED DESCRIPTION

I. Overview

The present embodiments relate to intelligently throttling a modification message based on a period of time that a trade order is required to remain in a market.

An electronic trading system may have an electronic exchange that requires a trade order to remain in a market (e.g., remain in an exchange order book) for a specified period of time. The electronic exchange will not accept modifications to a trade order prior to expiration of the specified period of time. Modifications are made using modification messages. A modification message may include a modification order that modifies (e.g., cancels or changes) a previously submitted trade order or a portion thereof. The electronic exchange will reject any modification orders that are received prior to the expiration of the specified period of time, causing the trading device to resend the modification message to effectively modify the trade order.

In an embodiment, intelligently throttling a modification message includes selecting a transmission time of a modification message based on a period of time that a trade order is required to remain in a market. The modification message is transmitted at the selected time to ensure that the modification order is received at an electronic exchange at or shortly after, but not before, the period of time has expired. As a result, the modification order is accepted (e.g., not rejected) by the electronic exchange. The modification order does not need to be resent to the electronic exchange.

Reference herein to "one embodiment," "an embodiment," or "an example embodiment" means that a particular feature, structure, or characteristic described in connection with the embodiment can be included in at least one embodiment of the invention. The appearances of these phrases in various places in the specification are not necessarily all referring to the same or single embodiment. In addition, separate or alternative embodiments are not mutually exclusive embodiments. Instead, the embodiments described herein, explicitly and implicitly understood by one skilled in the art, may be combined with other embodiments. The embodiments or combinations thereof are all within the scope of this patent document.

II. Exemplary Trading System

FIG. 1 illustrates a block diagram of an electronic trading system 100 having a trading device 104, a gateway 106, and a host electronic exchange system ("electronic exchange") 108. The trading device 104 and gateway 106 are communicatively coupled with the electronic exchange 108 via a network 102. The term "coupled with" includes directly connected to or indirectly connected through one or more intermediary components. Intermediary components may include hardware, software, or both hardware and software components. Furthermore, the electronic trading system 100 may include additional, different, or fewer components.

A. Network 102

The network 102 is a communication network configured to transmit data. The network 102 may include one or more communication networks. The network 102 may include hardware (e.g., servers, routers, gateways, and switches), software (e.g., a trading application or a communication application), transmission channels (e.g., T1 lines, T3 lines, Integrated Services Digital Network (ISDN) lines), telecommunication networks (e.g., data network, computer network, the Internet network, wide area network, local area network), or a combination thereof.

B. Trading Device 104 i. Trading Device 104 Facilitates Electronic Trading

The trading device 104 may be configured to facilitate electronic trading (e.g., buying or selling) of one or more tradeable objects. A tradeable object is any item, product, or object that can be traded with a quantity, price, or both. For example, financial products such as stocks, options, bonds, futures, currency, interest rates, warrants, funds, derivatives, securities, commodities, traded events, goods, index based products, and collections and/or combinations of these may be tradeable objects.

A tradeable object may be "real" or "synthetic." A real tradeable object includes products that are listed by an exchange. A synthetic tradeable object includes products that are defined by the user but are not listed by an exchange.

For example, a synthetic tradeable object may include a combination of real (or other synthetic) products such as a synthetic spread created by a trader utilizing a client device. The combination of product also may correspond to a real (exchange listed) combination (e.g., a synthetic spread and an exchange-listed spread).

The trading device 104 may generate a trade order message. A trade order message is a message that includes a trade order. A trade order is an order to buy or sell a tradeable object at a particular price. The trade order may also include a particular quantity to be bought or sold. The exact tradeable object, price, and/or quantity in the trade order may depend on a trading strategy. A trading strategy is a set of rules for making trading decisions.

For example, in an illustration, which will be referred to herein as "the illustration above," a trading strategy is a spread having a quoting leg and a hedge leg. In this illustration, the quoting leg is an order to buy a contract of Light Sweet Crude Oil (symbol: CL) listed at the Chicago Mercantile Exchange (CME) for a price of 88.65 and the hedge leg is an order to sell a contract of West Texas Intermediate (WTI) Light Sweet Crude Oil (symbol: T) listed at the Intercontinental Exchange (ICE). The price of the hedge leg depends on the price at which the CL contract is obtained and the desired spread price. The trading device 104 may generate a trade order message for the quoting leg and another trade order for the hedge leg.

The trading device 104 may transmit a trade order message to the electronic exchange 108. For example, in the illustration above, the trade order message for the quoting leg will be sent to the CME. When the quoting leg is filled, a trade order message for the hedge leg will be sent to the ICE. In an alternative embodiment, a trade order message may include multiple (e.g., two or more) trade orders. For example, in the event that the hedge leg involved a tradeable object at the CME, the trading device 104 may generate a trade order message including both the quoting leg and the hedge leg.

The trading device 104 manages one or more working orders. A working order is a trade order that is in an exchange's order book (e.g., in the market). Managing may include modifying a working order. Modifying may include cancelling or changing all or a portion of a working order. A market participant may determine that a working order should be modified for a number of reasons. For example, a working order may be cancelled to reduce the number of orders in the market. In another example, the price of a working order may be changed when the market participant believes that a more desirable price may be obtained. In yet another example, one or more working orders may be modified to obtain a trading strategy price. For example, in the illustration above, the trading device 104 may change the price of the quoting leg order.

Modifying a working order may include generating and/or sending a modification message. A modification message includes a modification order. A modification order is an order that cancels or changes all or a portion of a working order. The trading device 104 may generate a modification message in accordance with a trading strategy. For example, in the illustration above, a modification message may be generated to change the price of the quoting leg (e.g., the "CL" contract) when the price of the hedge leg contract (e.g., the "T" contract) changes. This may be done to obtain the strategy price. The trading device 104 may send the modification message to the electronic exchange 108 to effectively modify a working order.

The trading device 104 may intelligently throttle a modification message in accordance with an embodiment. For example, in an embodiment, the trading device 104 may intelligently select a transmission time of a modification message based on a period of time that a trade order is required to remain in a market. The modification message is transmitted at the selected time to ensure that the modification order is received at an electronic exchange at or shortly after, but not before, the period of time has expired.

ii. Trading Device 104 May be a Client Device, Gateway, or Server Side Device The trading device 104 may be owned, operated, programmed, or otherwise used by a market participant (e.g., a trader). The trading device 104 may be a computing device, such as a client device, a gateway, or a server side device. These components are discussed in more detail below.

In an embodiment, the trading device 104 is a client device. A client device is a personal computer, automated computing device, or other computing device hosted by the electronic exchange 108. In an example, a client device is a personal computer that displays market data received from an electronic exchange 108, or at least a portion thereof, on a display device. The market data may be displayed as part of an interface that is part of a trading screen. A trading screen is interactive and enables a market participant to participate in electronic trading. A trading screen may enable a user to view market data, submit a trade order, obtain a market quote, monitor orders in a market, monitor a position, and combinations thereof. Exemplary trading tools that provide interfaces include X_TRADER® and MD Trader®, which are commercially offered by Trading Technologies International, Inc., located at 222 South Riverside Plaza, Chicago, Ill., 60606. In another example, the client device is an automated computing device that does not display market data. The automated computing device is programmed to receive market data and act upon the data without displaying any information or receiving manual input from a market participant.

In another embodiment, the trading device 104 is a gateway. Generally, as will be discussed in more detail below, a gateway facilitates communication between communication devices, such as the trading device 104 and the electronic exchange 108. However, in some embodiments, a gateway may be to perform intelligent throttling in accordance with an embodiment.

In yet another embodiment, the trading device 104 is a server side device. A server side device may be a server that is configured to automatically communicate with the electronic exchange 108 on behalf of a market participant. In some instances, the server side device performs automated trading in accordance with a trading strategy defined by the market participant. For example, a server side device may be a server running an automated trading tool, such as Autotrader™ or Autospreader®, which are also provided by Trading Technologies International, Inc. The server side device may be collocated with (e.g., placed at a physical location proximate or substantially proximate) the electronic exchange 108 to reduce or mitigate the transmission time or latency between the electronic exchange 108 and the server side device.

iii. Components Included in Trading Device 104

The trading device 104 may include a processor, which provides overall control. The processor may be connected via a bus to memory, a network interface, a display, an input device, or any combination thereof. The processor is a device or system for processing data.

The memory is computer-readable storage media. Computer-readable storage media includes various types of volatile and non-volatile storage media. Examples of computer-readable storage media include but are not limited to a random access memory, a read-only memory, and a hard disk drive. The memory may be configured to store data that may be accessed by the processor. For example, the memory may include a software application having one or more instructions that may be executed by the processor. In an embodiment, a software application includes instructions for intelligently throttling a modification message in accordance with an embodiment. The software application is stored in the computer-readable media.

A copy of a software application may be placed onto the computer-readable media by receiving the software application over a network from some other source like a remote server, which could also have a copy of the software application. In addition, it is understood that the trading device 104 may receive a software application on a vendor's system through a web browser or a thin-client. In other words, a trading device 104 may receive software in accordance with an application service provider (ASP) model.

C. Gateway 106

The gateway 106 may facilitate communication between communication devices, such as the client device 104 and the electronic exchange 108. For example, the gateway 106 may receive a message that includes a trade order from a client device 104 and transmit the message to the electronic exchange 108. As another example, the gateway 106 may receive a data feed from the electronic exchange 108 and transmit the data feed to the client device 104.

The gateway 106 is a computing device that is equipped for interfacing networks that use different protocols. For example, the gateway 112 may process a message that includes a trade order received from the client device 104. The gateway 106 may convert the message into a format accepted by the electronic exchange 108 and transmit the message to the electronic exchange 108. Similarly, the gateway 106 may transform a data feed that is in an exchange-specific format into a format understood by the client device 104. The gateway 106 may also perform other actions. For example, the gateway 106 may coalesce market data from one or more electronic exchanges and provide it to the client device 104.

D. Electronic Exchange 108

The electronic exchange 108 may list one or more tradeable objects for electronic trading. The electronic exchange 108 includes at least one computing device for receiving and matching trade orders for a tradeable object. For example, as shown in FIG. 1, the electronic exchange 108 may include a system of servers. However, in other embodiments, the electronic exchange 108 may include a single computing device.

The electronic exchange 108 may provide market data to subscribing client devices. Market data includes data that is related to a market for a tradeable object. For example, market data may include an inside market, market depth, last trade price, and a last traded quantity. The inside market is the lowest available ask price (best ask) and the highest available bid price (best bid) in the market for a particular tradeable object at a particular point in time. Market depth refers to quantities available at the inside market and may also refer to quantities available at other prices away from the inside market. The last traded price is a price at which the tradeable object was last traded. The last traded quantity (LTQ) is a quantity that last traded. Market data may include other data.

The electronic exchange 108 may attempt to match a trade order received from the trading device 104 against existing contra-side trade orders in an exchange trade order book or received from other trading devices. In the event that the received trade order cannot be matched, the trade order is placed in an exchange order book, for example, on behalf of a market participant.

An order book is a database that includes data relating to unmatched quantity of trade orders. The order book includes data relating to a market for a tradeable object. The order book may be used by a matching algorithm, such as a first-in first-out (FIFO) matching algorithm, to match contra-side bids and offers.

In some embodiments, the electronic exchange 108 requires a trade order to remain in the order book (e.g., remain in the market) for a required period of time. Requiring a trade order to remain in the order book may include rejecting a modification message that includes a modification order attempting to modify a trade order prior to the expiration of the period of time. Rejecting a modification message may include sending a rejection message that indicates that a modification order was rejected, ignoring the modification message (e.g., dropping the modification order and not sending a rejection message), or otherwise not allowing the modification order to effectively modify the trade order.

Electronic exchanges may have different requirements for remaining in the order book. For example, a first electronic exchange may require a trade order to remain in the order book for 250 milliseconds. A second electronic exchange may require a trade order to remain in the order book for 350 milliseconds. The first electronic exchange may be different than the second electronic exchange. Furthermore, the requirement may be based on additional factors such as size of the trade order, time of day, amount of volume, volatility, parameters of a trade order, status of a trader with an electronic exchange (e.g., market maker status), related events, and the like.

Figure 2:
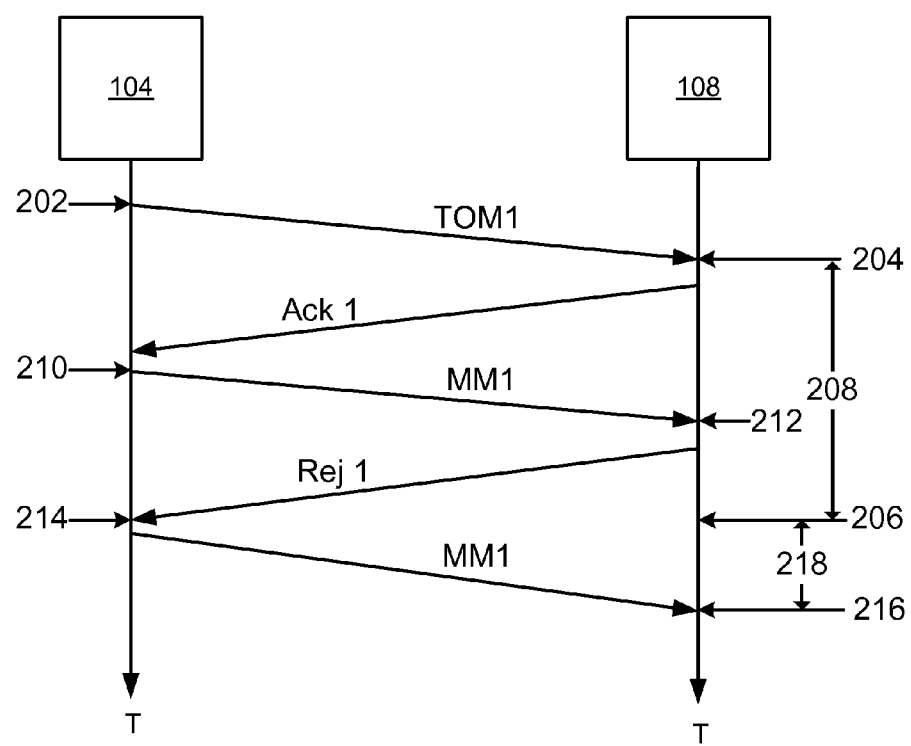
FIG. 2 is a timing diagram of a process for rejecting modification messages that are received at an electronic exchange prior to the expiration of a period of time.

FIG. 2 illustrates an example of an electronic exchange 108 that rejects a modification order because the modification order was received prior to the expiration of a specified period of time. At time 202, the trading device 104 submits a trade order message TOM1 to the electronic exchange 108. At time 204, the electronic exchange 108 receives the trade order message TOM1. At or shortly after time 204, the trade order(s) in the trade order message TOM1 is placed in the exchange order book, for example, assuming that the trade was not matched. Time 204 follows time 202 generally by a period of time caused by the transmission of the trade order TOM1 from the trading device 104 to the electronic exchange 108 and period of time for processing the trade order TOM1 at the electronic exchange 108.

It should be noted that the times shown herein are used to illustrate concepts and/or relationships. The actual time is not as important as the concepts illustrated. Accordingly, the times discussed herein may be exact times or approximations. For example, as shown in FIG. 2, the time that the trade order TOM1 is placed in the exchange order book may be the same time or slightly different (e.g., substantially the same) than time 204. This difference may be caused as a result of processing the trade order TOM1 and the time needed to place the trade order in the exchange order book. As mentioned above, the drawings are intended to illustrate various concepts. The timing diagrams discussed herein are intended to include these and other similar differences in timing.

The electronic exchange 108 may have a requirement for the trade order, which was in the trade order message TOM1, to remain in the market for a specific period of time. For example, the electronic exchange 108 may require the trade order to remain in the market for time period 208. In other words, the trade order must remain in the market until time 206. Depending on various circumstances (e.g., the exchange, the type of order, the trader, etc.), the time period 208 may be a fixed period of time (e.g., 250 milliseconds, 5 seconds, or 5 minutes) and may be determined or set by the electronic exchange 108 prior to trading.

At or shortly after receiving the trade order message TOM1 and placing the trade order in the exchange order book, the electronic exchange 108 transmits an acknowledgment Ack1. The acknowledgement Ack1 is a message that is transmitted to the trading device 104 to confirm receipt of the trade order message TOM1. The acknowledgement Ack1 may include an identification (e.g., number) that identifies the trade order in the trade order message T01, such that the trading device 104 may specifically reference the trade order TO1 in the future.

Upon receiving (or at some point after receiving) the acknowledgement Ack1, the trading device 104 may transmit a modification message MM1 to the electronic exchange 108. The modification message MM1 is transmitted to the electronic exchange 108 at time 210 and is received by the electronic exchange 108 at time 212. However, because time 212 is inside the time period 208 (i.e., time 206 has not occurred yet), the electronic exchange 108 rejects the modification message MM1 and sends a rejection message Rej1 to the trading device 104. The rejection message Rej1 is a message that indicates that the modification message MM1 was rejected. Upon receiving the rejection message Rej1, the trading device 104 resends the modification message MM1 to the electronic exchange 108. Since the modification message MM1 is received at time 216, which is after time 206, the electronic exchange 108 accepts the modification message MM1 and modifies the trade order TO1 (e.g., cancels the trade order TO1).

The process shown in FIG. 2 may require the transmission of additional, non-necessary messages. The trading device 104 sends the modification message MM1 twice in order to effect the change of the trade order. This adds to the number of messages that the trading device 104 sends to the electronic exchange 108. One skilled in the art will realize that this may increase the processing load for the trading device 104 and/or the electronic exchange 108. The bandwidth requirement needed to operate the system is effectively increased because of the increased number of messages and transmissions.

Furthermore, the process shown in FIG. 2 exposes a market participant to additional risk because a trade order is left in the market for an unnecessary and extended period of time, relative to when the trade order is first able to be modified in accordance with the requirement. For example, during time period 218 the trade order TO1 was modifiable. However, the modification message is not received until time 216.

III. Throttling of Modification Messages

Various embodiments described herein relate to intelligently throttling a modification message based on a period of time that a trade order is required to remain in a market. For example, in an embodiment, intelligently throttling a modification message includes intelligently selecting a transmission time of a modification message based on a period of time that a trade order is required to remain in a market and transmitting the modification message at the selected time to ensure that the modification order is received at an electronic exchange at or shortly after, but not before, the period of time has expired.

Figure 3:
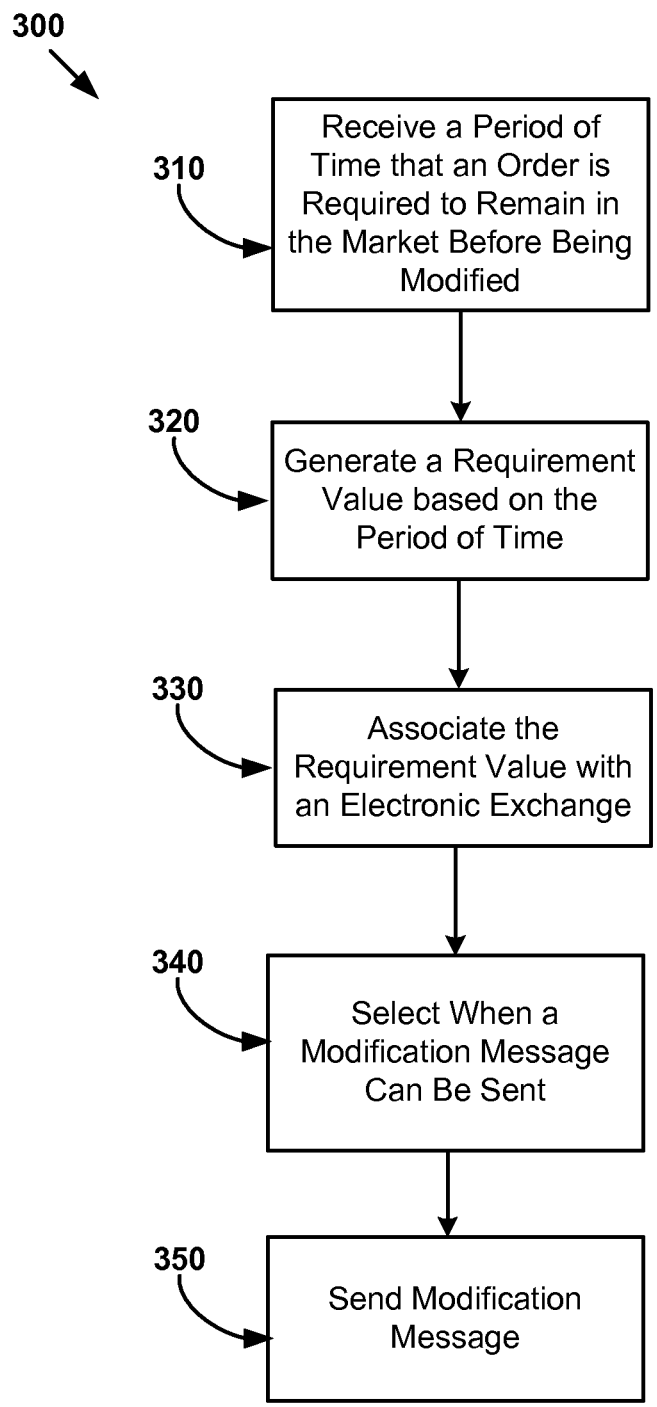
FIG. 3 is a flowchart that illustrates an exemplary process for intelligently throttling modification messages in accordance with an exemplary embodiment.

FIG. 3 is a flowchart that illustrates a method 300 that may be carried out by any of an apparatus (e.g., trading device 104), a system, a computer program, and a computer readable medium, combinations thereof and the like. The method 300 may be used to intelligently throttle one or more modification messages in accordance with an embodiment.

Before explaining further, it is noted that the inventions described herein are not limited to the process shown and described with respect to FIG. 3. Changes and modifications may be made without departing from the spirit and scope of certain inventive aspects. For example, additional, different, or fewer acts may be provided. For example, as will be discussed below, act 320 may not be needed. Furthermore, the acts shown in FIG. 3 may be performed in the order shown or a different order.

In act 310, a trading device receives a period of time that a trade order is required to remain in a market before being modified. The period of time may be a value of time, such as 250 milliseconds or other amount of time. Receiving the period of time may include receiving the period of time from an electronic exchange or as an input from a market participant (e.g., using a mouse and keyboard). For example, the period of time may be received from an electronic exchange during a handshake process or other communication session with the electronic exchange. In another example, a market participant inputs the period of time using a configuration screen of a trading screen. In yet another example, the period of time is hardcoded or provided by an Independent Software Vendor ("ISV") in its software and/or updates.

In act 320, the trading device generates a requirement value that is based on the period of time that a trade order is required to remain in the market before being modified. The requirement value is a value used to determine when an electronic exchange will accept modification messages. In some embodiments, the requirement value is the same as the period of time received in act 310. For example, a trading device may generate a requirement value that is the same as the period of time received in act 310. In another example, a trading device treats the period of time received in act 310 as the requirement value and thus a requirement value does not need to be generated (e.g., act 320 is not performed by the trading device).

In other embodiments, generating a requirement value includes generating a requirement value that is slightly longer or shorter than the period of time received in act 310. The requirement value may be customized to account for unexpected speed or delays, for example, during processing or transmission. For example, in the event that the period of time received in act 310 is 350 milliseconds, the requirement value may be adjusted to 355 milliseconds. The 5 millisecond buffer may ensure that a modification message is not rejected of a network or processing delay, for example.

In act 330, the trading device associates the requirement value with the appropriate electronic exchange. The association ensures that a modification message transmitted to the electronic exchange is intelligently throttled based on the requirement value. Associating may include automatically (e.g., without or with little market participant input) or manually (e.g., using market participant input) associating a requirement value with an electronic exchange. For example, a market participant may use a configuration screen to manually associate a requirement value with an electronic exchange.

FIG. 4 illustrates a diagram of a configuration screen 400. The configuration screen 400 allows a market participant using a trading device to associate a requirement value with an electronic exchange, such that modification messages sent to the electronic exchange are throttled in accordance with the requirement value. The configuration screen 400 is used to enter and associate values in an intelligent throttling application.

In an embodiment, a period of time 410 that Exchange A requires a trade order to remain in the market is manually (e.g., with input from a market participant) or automatically (e.g., received from the electronic exchange) entered into the intelligent throttling application. In an embodiment, a market participant may input an associated requirement value 420 that is associated with the received period of time 410. However, in another embodiment, the market participant inputs a buffer 430. The buffer 430 is used to determine the requirement value 420. For example, the requirement value 420 is automatically calculated based on the period of time 410 and the buffer 430. Accordingly, any time that the period of time 410 is automatically updated, for example, by Exchange A, then the requirement value 420 is also automatically updated. The requirement value 420 is associated with Exchange A.

In another embodiment, a market participant may use the configuration screen 400 to associate multiple requirement values with an exchange. For example, as shown in FIG. 4, period of times 430, 460 and requirement values 440, 470 may be associated with Exchange B. The values may dynamically change throughout the course of a day. For example, during the time of day 450 (e.g., from 8:00-10:00 am), period of time 430 and requirement value 440 may be used. During the time of the day 480, period of time 460 and requirement value 470 may be used. The requirement values 440, 470 are associated with Exchange B. Other factors may also be used to further control intelligent throttling.

Turning back to FIG. 3, in act 340, the trading device selects when a modification message can be sent to the electronic exchange without the modification message being rejected. Selecting may include calculating or otherwise determining. Selection is based on the requirement value generated in act 320. Basing the selection on the requirement value ensures that the modification message is received at or shortly after the period of time that a trade order is required to remain in the market has expired or lapsed.

The selection may also be based on, for example, a transmission time between the trading device and electronic exchange, a time at which an acknowledgement message is transmitted by the electronic exchange, a time at which an acknowledgment message is received by the trading device, a time at which the trade order message was transmitted to the electronic exchange, a time for processing the trade order at the electronic exchange, a size of the message communicating the trade order, a time of day, volume in the market, a combination thereof, or other factors for determining that the modification message is received at or shortly after the time in the market value has lapsed.

In an embodiment, in addition to the requirement value, the trading device selects when a modification message can be sent based on the time at which a trade order is placed in an order book (e.g., at or about the same time as an acknowledgement order is transmitted) and the time it takes for a message to be transmitted between the electronic exchange and the trading device.

In another embodiment, in addition to the requirement value, the trading device selects when a modification message can be sent based on the time at which a trade order message is submitted to an electronic exchange, the time it takes for a trade order message to travel between the trading device and the electronic exchange, and the time it takes for a modification message to travel between the trading device and the electronic exchange.

In act 350, the trading device sends a modification message, which modifies the trade order in the originally submitted trade order message, to the electronic exchange at the time when a modification message can be sent to the electronic exchange without the modification message being rejected. Accordingly, the electronic exchange receives the modification message at or shortly after the time in the market value has expired.

Sending the modification message may include transmitting the modification message to the electronic exchange at the time selected in act 340. Act 340 may include delaying or waiting for a determined period of time before sending the modification message. For example, the modification message may be queued until it is ready to be sent. The delay may be based on the determination made in act 340. For example, in act 340, the trading device may select a specific time that the modification message can be sent without being rejected. Now, in act 350, the trading device may send the modification message at that specific time.

Figure 5:
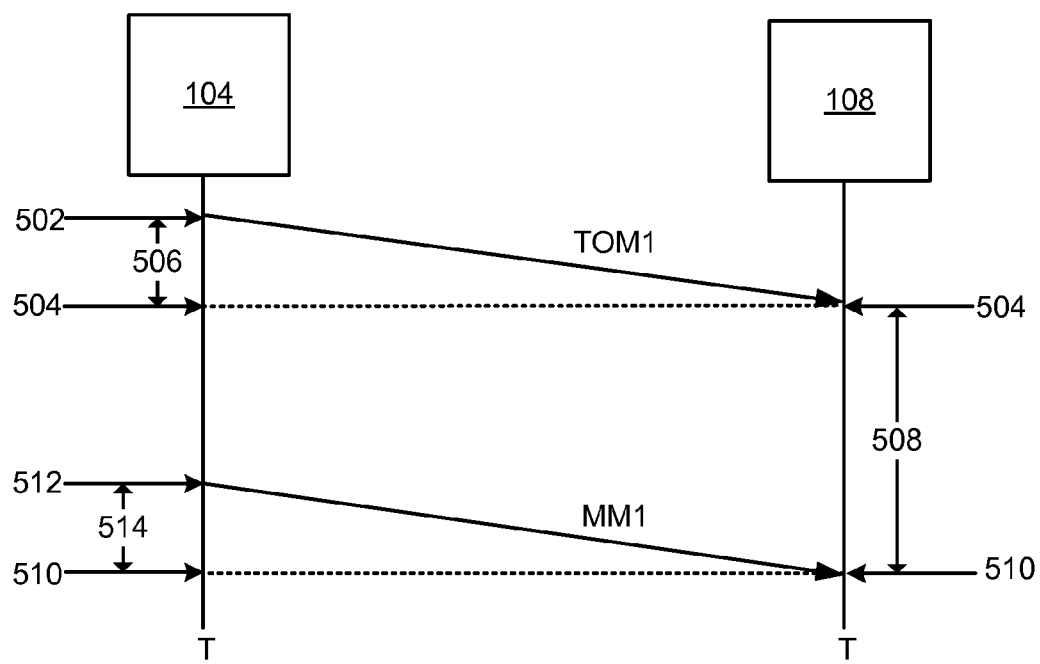
FIG. 5 is a timing diagram that illustrates an example of throttling modification messages.

FIG. 5 illustrates a timing diagram of a messaging process where a working order is unable to be modified for a specific period of time because of one or more requirements by an electronic exchange. FIG. 5 illustrates a time axis T for the messaging between the trading device 104 and electronic exchange 108 of FIG. 1. The trading device 104 of FIG. 5 is configured to intelligently throttle a modification message in accordance with an embodiment. As will be explained in more detail below, the trading device 104 intelligently throttles a modification message based on a trade order submission time, a trade order transmission time, a modification message transmission time, and a requirement value.

At time 502, the trading device 104 transmits a trade order message TOM1. The electronic exchange 108 receives the trade order message TOM1 at time 504. Time 504 occurs subsequent to (e.g., at a later time than) time 502 because of the transmission time 506 for the trade order message TOM1 to traverse from the trading device 104 to the electronic exchange 108.

The electronic exchange 108 may place a trade order, which was in the trade order message TOM1, in the electronic exchange's order book, for example, at or shortly after being received at the electronic exchange 108. Because of standards or rules set by the electronic exchange 108, the trade order is unable to be modified during time period 508. In other words, the trade order is required to remain in the order book for the entire duration of time period 508. In this example, time period 508 is the requirement value. However, after time period 508 has expired, for example, at time 510, the trade order may be modified. During time period 508, the electronic exchange 108 will reject modification messages that are attempting to modify the trade order.

In the event a modification is to be made to the trade order, the trading device 104 selects when a modification message can be sent without the electronic exchange 108 rejecting the modification order. In the example of FIG. 4, the electronic exchange 108 accepts modifications of the trade order at time 510, which is the expiration of time period 508. Accordingly, the trading device 104 determines the time value of time 510.

In the example of FIG. 4, the trading device 104 determines the time value of time 510 based on the trade order submission time 502, the trade order transmission time 506, and the requirement value 508. The trade order submission time 502 may be recorded when the trading device 104 submits the trade order message TOM1 to the electronic exchange 108. The trade order transmission time 506 may be calculated, estimated, or otherwise determined using communication analytics that determine transmission times through networks. The requirement value 508 may be input by a market participant or received from the electronic exchange 108, for example. To determine the time value for time 510, the trading device 104 may add the trade order submission time 502, the trade order transmission time 506, and the requirement value 508 together (e.g., 510=502+ 506+508).

A trading device may select a time at which modification messages may be sent without being rejected by an electronic exchange. For example, in the illustration of FIG. 4, the trading device 104 may calculate a time 512 at which a modification message MM1 may be sent without being rejected at the electronic exchange 108. This calculation is based on the time 510 at which the electronic exchange 108 will begin accepting modification messages and a modification message transmission time 514. The modification message transmission time 514 is the modification message transmission time is an amount time needed for the modification message to travel from the trading device 104 to the electronic exchange 108. The modification message transmission time 514 may be calculated, estimated, or otherwise determined using communication analytics that determine transmission times through networks. To determine the time value of time 512, the trading device 104 subtracts the modification message transmission time 514 from the time 510 (e.g., 512=510-514).

Accordingly, starting at time 512, the trading device 104 may send a modification message MM1 to the electronic exchange 108 without the modification message MM1 being rejected. Of course, the modification message MM1 does not need to be sent right at time 512. Instead, the modification message MM1 may also be sent at any time after time 512. Sending the modification message MM1 at or after time 512 will ensure that the modification message MM1 is not rejected for attempting to modify a trade order prior to the expiration of a required period of time in the market.

Before illustrating a few other examples, it is worth noting that the trading device, when determining all or some of the time values, may add additional time to all or some of the time values. For example, additional time may be added to the trade order transmission time 506, the modification message transmission time 514, and/or the requirement value 508 to further ensure that the modification message MM1 is not rejected at the electronic exchange. The added period of time may be used to account for unexpected speed through a network or unexpected processing speed at the electronic exchange, for example.

Figure 6:
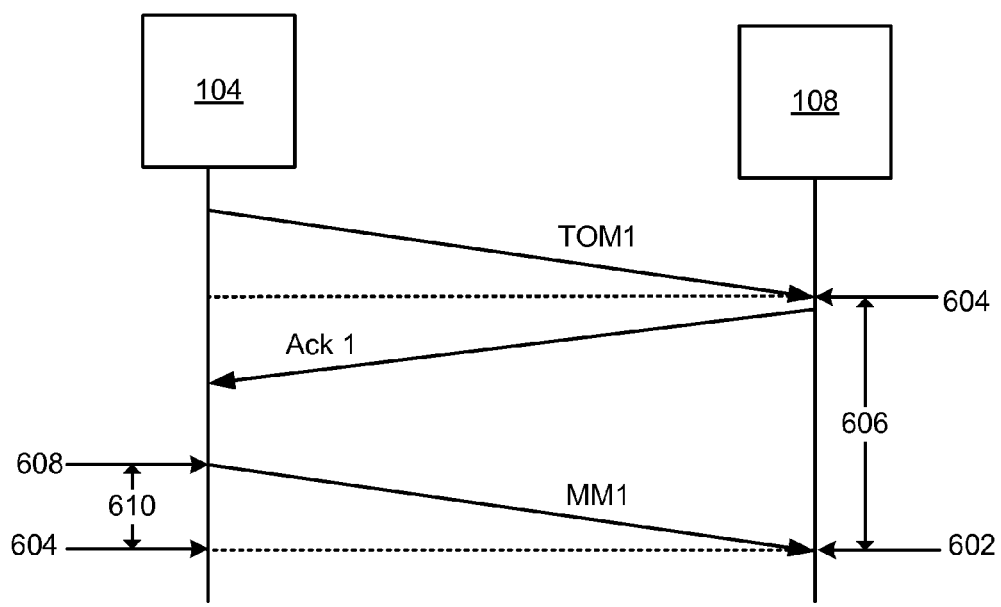
FIG. 6 is a timing diagram that illustrates another example of throttling modification messages.
Figure 7:
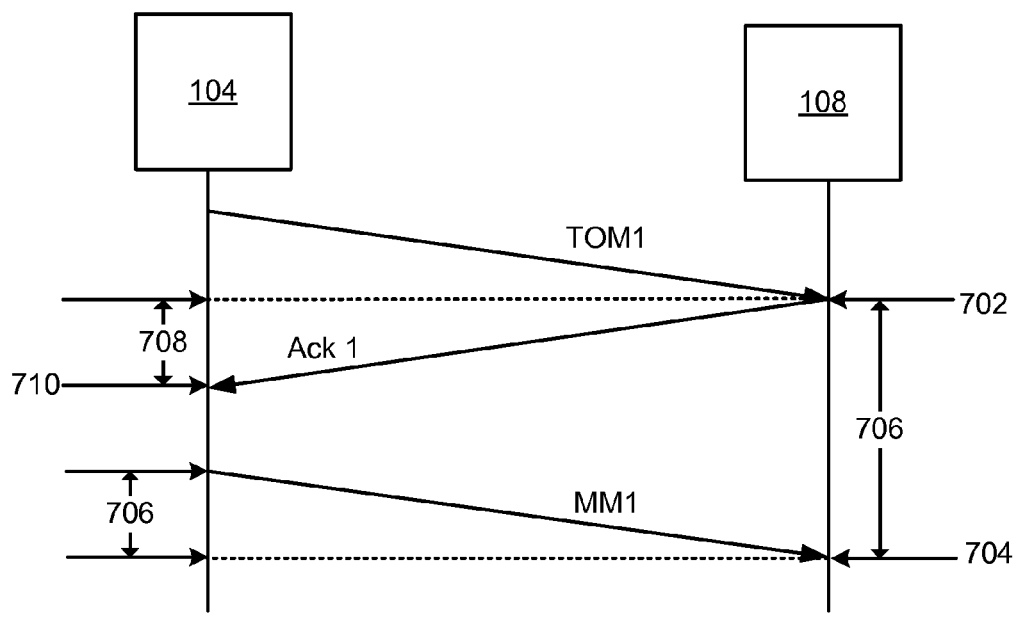
FIG. 7 is a timing diagram that illustrates another example of throttling modification messages.

FIGS. 6 and 7 illustrate additional examples of determining a time at which a modification message may be sent to an electronic exchange without the modification message being rejected. The examples shown in FIGS. 6 and 7 use an acknowledgment message to determine the time at which the modification message can be sent. In FIG. 6, the trading device uses an order book entry time value (e.g., the time at which a trade order is placed in the order book) included in the acknowledgment message to determine when a trade order is modifiable. In FIG. 7, transmission time of the acknowledgment message is used to determine when a trade order is modifiable.

In an embodiment, as shown in FIG. 6, the electronic exchange 108 may send the actual time 602 at which a trade order may be modified. The electronic exchange 108 may determine the value for time 602 using the order entry time value 604 and the requirement value 606, for example. An order entry time value is a time at which a trade order is placed in the order book. To determine the value for time 602, the electronic exchange 108 may add together the order entry time value 604 and the requirement value 606 (e.g., 602=604+606). In this example, the time 602 is sent in an acknowledgment message Ack1 that acknowledges or confirms the receipt of the trade order message TOM1. However, in other embodiments, the time 602 may be sent in other types of messages.

In another embodiment, instead of sending the time 602 at which a trade order may be modified, the electronic exchange 108 may send the order entry time value 604 and the time period 606, for example, at the same or different times. The trading device 104 may use these values to determine the time 602.

Once the trading device 104 has received the time 602, the trading device 104 may determine the time 608 at which a modification message MM1 may be sent without the modification message MM1 being rejection. Similar to the embodiment described above for FIG. 4, this determination is based on the time 602 and the modification message transmission time 610. In particular, the time 608 may be determined by subtracting the modification message transmission time 610 from the time 602 (e.g., 608=602-610).

In an embodiment, as shown in FIG. 7, a time stamp may be used to obtain the time at which a modification message will be accepted. The electronic exchange 108 may time stamp the acknowledgment message Ack1 at a time 702 when transmitted to the trading device 104. The time stamp 702 may be used to estimate the order entry time value. For example, the time stamp 702 may be used as the order entry time value because there may be a small (or zero) delay between the time at which the trade order is placed in order book and the time the acknowledgment message Ack1 is sent to the trading device 104. The trading device 104 may determine the time 704 at which a modification message MM1 may be received at the electronic exchange 108 using the time stamp 702 and the requirement value 706. For example, the requirement value 706 may be added to the time stamp 702 to obtain the time 704.

In another embodiment, the acknowledgment Ack 1 does not include a time stamp. The trading device 104 may estimate or use network analytics to calculate the transmission time 708 of the acknowledgment message Ack1. To obtain the time 702 at which the acknowledgment message Ack1 was sent from the electronic exchange 108, the trading device 104 may subtract the acknowledgment transmission time 708 from the acknowledgment receipt time 710. The acknowledgment receipt time 710 is the time at which the acknowledgment message Ack1 is received at the trading device 104. As discussed above, the time 702 may be used as the order entry time value.

In some embodiments, the modification message may be submitted prior to the expiration of the time period, but within a known, measured, or estimated time for transmission of the modification message to the electronic exchange. Accordingly, a modification message for modifying a working order is not rejected by the electronic exchange as a result of being received before the predetermined period of time expires.

Various embodiments described herein may include any of an apparatus, a method, a system, a computer program, and an article of manufacture embodied as a computer readable medium. By way of illustration, the computer readable medium may include volatile and non-volatile storage media, such as random access memory, read-only memory, flash memory, magnetic tape, disk, optical media, any combination thereof, or any now know or later developed tangible data storage device. The embodiments may be resident at the trading device 104 or some other computer device, such as a remote server.

The invention claimed is:

1. A method comprising:
   determining, by a computing device, an estimated message transmission time between the computing device and an electronic exchange;
   receiving, by the computing device, a first user input from a trader to trade a tradeable object that is listed at the electronic exchange;
   sending, from the computing device to the electronic exchange, a trade order to trade the tradeable object, the trade order being a request to buy or sell the tradeable object that is listed at the electronic exchange and pending execution in a market at the electronic exchange for the tradeable object subsequent to sending the trade order to the electronic exchange;
   receiving, by the computing device, a period of time during which the trade order pending execution in the market at the electronic exchange for the tradeable object is required by the electronic exchange to remain pending in the market at the electronic exchange without modification by the trader;
   determining, using the computing device, an earliest modification time for sending a modification message to modify the trade order that was previously sent and is pending execution in the market at the electronic exchange for the tradeable object, the earliest modification time being determined based on an order entry time received in an acknowledgment message from the electronic exchange confirming that the trade order was received at the electronic exchange, the period of time during which the trade order pending execution in the market at the electronic exchange for the tradeable object is required by the electronic exchange to remain pending in the market without modification by the trader and the estimated message transmission time, wherein the order entry time is a time at which the pending trade order was placed in the market;
   receiving, by the computing device, a second user input from the trader to send the modification message to the electronic exchange to modify the trade order pending execution at the electronic exchange and wherein the modification message includes a modification order that modifies the trade order;
   in response to receiving the second user input prior to expiration of the determined earliest modification time, sending, by the computing device at the determined earliest modification time, the modification message to the electronic exchange at which the pending trade order is in the market to modify the pending trade order, wherein the modification message is not received by the electronic exchange before expiration of the period of time during which the pending trade order is required to remain pending in the market without modification by the trader, and wherein the modification message includes the modification order that modifies the trade order; and
   in response to receiving the second user input subsequent to expiration of the determined earliest modification time, sending, by the computing device, the modification message to the electronic exchange at which the pending trade order is in the market to modify the pending trade order, and wherein the modification message includes the modification order that modifies the trade order.

2. The method of claim 1, wherein the estimated message transmission time is an amount of time for the modification message to travel from the computing device to the electronic exchange.

3. The method of claim 1, wherein sending the modification message further includes queuing the modification message until the determined earliest modification time.

4. The method of claim 1, wherein determining the earliest modification time comprises calculating when the pending trade order can be modified without being rejected from the electronic exchange.

5. The method of claim 1, wherein determining the earliest modification time includes receiving an acknowledgment message from the electronic exchange, wherein the acknowledgment message is a message confirming that the trade order was received at the electronic exchange.

6. A non-transitory computer readable medium having stored therein instructions executable by a processor, wherein the instructions are executable to:
   determine, by a computing device, an estimated message transmission time between the computing device and an electronic exchange;
   receive, by the computing device, a first user input from a trader to trade a tradeable object that is listed at the electronic exchange;
   send, from the computing device to the electronic exchange, a trade order to trade the tradeable object, the trade order being a request to buy or sell the tradeable object that is listed at the electronic exchange and pending execution in a market at the electronic exchange for the tradeable object subsequent to sending the trade order to the electronic exchange;
   receive, by the computing device, a period of time during which the trade order pending execution in the market at the electronic exchange for the tradeable object is required by the electronic exchange to remain pending in the market at the electronic exchange without modification by the trader;
   determine, using the computing device, an earliest modification time for sending a modification message to modify the trade order that was previously sent and is pending execution in the market at the electronic exchange for the tradeable object, the earliest modification time being determined based on an order entry time received in an acknowledgment message from the electronic exchange confirming that the trade order was received at the electronic exchange, the period of time during which the trade order pending execution in the market at the electronic exchange for the tradeable object is required by the electronic exchange to remain pending in the market without modification by the trader and the estimated message transmission time, wherein the order entry time is a time at which the pending trade order was placed in the market;
   receive, by the computing device, a second user input from the trader to send the modification message to the electronic exchange to modify the trade order pending execution at the electronic exchange and wherein the modification message includes a modification order that modifies the trade order;
   in response to receiving the second user input prior to expiration of the determined earliest modification time, send, by the computing device at the determined earliest modification time, the modification message to the electronic exchange at which the pending trade order is in the market to modify the pending trade order, wherein the modification message is not received by the electronic exchange before expiration of the period of time during which the pending trade order is required to remain pending in the market without modification by the trader, and wherein the modification message includes the modification order that modifies the trade order; and in response to receiving the second user input subsequent to expiration of the determined earliest modification time, sending, by the computing device, the modification message to the electronic exchange at which the pending trade order is in the market to modify the pending trade order, and wherein the modification message includes the modification order that modifies the trade order.

7. The non-transitory computer readable medium of claim 6, wherein the estimated message transmission time is an amount of time for the modification message to travel from the computing device to the electronic exchange.

8. The non-transitory computer readable medium of claim 6, wherein the instructions are executable to queue the modification message until the determined earliest modification time.

9. The non-transitory computer readable medium of claim 6, wherein determining the earliest modification time comprises calculating when the pending trade order can be modified without being rejected from the electronic exchange.

10. The non-transitory computer readable medium of claim 6, wherein the instructions are executable to receive an acknowledgment message from the electronic exchange, wherein the acknowledgment message is a message confirming that the trade order was received at the electronic exchange.

* * * * *